United States Patent [19]

Steffel

[11] Patent Number: 5,003,568

[45] Date of Patent: Mar. 26, 1991

[54] OMNI-DIRECTIONAL X-RAY TUBE

[75] Inventor: Horst Steffel, Gross Grönau, Fed. Rep. of Germany

[73] Assignee: Spezialmaschinenbau Steffel GmbH & Co. KG, Fed. Rep. of Germany

[21] Appl. No.: 554,963

[22] Filed: Jul. 20, 1990

Related U.S. Application Data

[63] Continuation of Ser. No. 267,523, Nov. 4, 1988, abandoned.

[30] Foreign Application Priority Data

Aug. 25, 1988 [EP] European Pat. Off. ........ 88113832.5

[51] Int. Cl.[5] .............................................. G01N 23/02

[52] U.S. Cl. ....................................... 378/61; 378/124; 378/134

[58] Field of Search ...................... 378/58, 61, 62, 124, 378/134, 137-138, 140, 143-144

[56] References Cited

U.S. PATENT DOCUMENTS

| | | | |
|---|---|---|---|
| 2,215,426 | 9/1940 | Machlett | 378/134 |
| 2,812,462 | 11/1957 | Maltby et al. | 378/143 |
| 2,836,757 | 5/1958 | Atlee | 378/124 |
| 3,518,745 | 11/1964 | Stanhope | 378/124 |
| 3,649,861 | 3/1972 | Atlee et al. | 378/134 |
| 3,873,837 | 3/1975 | Palermo, Jr. | 378/61 |
| 4,032,785 | 6/1977 | Green et al. | 378/61 |
| 4,573,186 | 2/1986 | Reinhold | 378/138 |
| 4,679,219 | 7/1987 | Ozuki | 378/135 |
| 4,759,047 | 7/1988 | Donges et al. | 378/57 |

FOREIGN PATENT DOCUMENTS

| | | | |
|---|---|---|---|
| 2138433 | 2/1973 | Fed. Rep. of Germany | 378/134 |
| 2231792 | 1/1974 | Fed. Rep. of Germany | 378/61 |
| 2157964 | 9/1976 | Fed. Rep. of Germany | . |
| 2237153 | 5/1978 | Fed. Rep. of Germany | . |
| 2262982 | 10/1978 | Fed. Rep. of Germany | . |
| 2239003 | 11/1978 | Fed. Rep. of Germany | . |
| 2248876C2 | 11/1983 | Fed. Rep. of Germany | . |
| 3229913A1 | 3/1984 | Fed. Rep. of Germany | . |
| 3530938A1 | 3/1987 | Fed. Rep. of Germany | . |
| 3530955A1 | 3/1987 | Fed. Rep. of Germany | . |

*Primary Examiner*—Craig E. Church
*Attorney, Agent, or Firm*—Brown, Martin, Haller & McClain

[57] ABSTRACT

Omni-directional X-ray tube having a target which is at least partially surrounded by an annular window passed by the X-rays, the cathode and the electron optics and the targets being designed such that the radiation passing the window is sweeping a larger sector in the plane of the window. The cathode arrangement includes at least two electron sources with an associated electron optics. The formation of the electron optics and of the targets is such that for each electron optic a focal point is generated on the target and the radiation originating from the individual focal points are sweeping about adjacent subsectors which are approximately screened against each other to avoid an overlapping.

11 Claims, 3 Drawing Sheets

OMNI-DIRECTIONAL X-RAY TUBE

This is a continuation of U.S. patent application Ser. No. 07/267,523 , filed 11/4/88.

The invention refers to an omni-directional X-ray tube according to the preamble of claim 1.

It is known for the structural tests of vehicle tires to penetrate the tires with X-rays and to reproduce an image on a monitor. From the German patent specification No. 22 39 003 an X-ray examination device is known which needs three X-ray tubes. The total examination device is relatively expensive and does not permit a non-distorted image and thus a satisfactory failure recognition and failure determination, respectively. From the German patent specification No. 22 62 982 is further known to use a so-called omni-directional X-ray tube. Such omni-directional X-ray tube is located in the space surrounded by the tire adjacent the opened inner side thereof or within the tire, respectively, so that the radiation emanating from the tube penetrates the lateral walls and the tire tread.

Known omni-directional X-ray tubes have an annular window through which the radiation passes, and the electron beam optics or the targets, respectively, are designed such that the radiation passing the window extends about a large sector; e.g. an arc angle of about 180° and more. The radiation angle transverse thereto amounts for example 40°. In the examination of tires, however, and for similar examinations the use of an omni-directional X-ray tube provides considerable advantages. The X-ray source can be brought in close proximity to the areas to be examined. The X-ray source, thus, can be operated using a low power which has a favorable effect on the contrast achieved between rubber and, for example, plastics or embedded wires. A further advantage is to be seen in the remarkable reduction of the dimensions of the complete X-ray device. As a result, not only the expense of the apparatus itself is reduced, but a corresponding saving as to the necessary space is obtained. A further advantage relies on the fact that an approximately perpendicular penetration of all tire areas to be examined can be achieved and thus a distortionless image on the reproduction device, e.g. an image screen. Such advantages are amplified if three linear arrangements of light-sensitive diodes (diode lines) are arranged parallel to the diameter or to the axis, respectively, of the tire which serve as receiving means for the X-rays.

Prior art omni-directional X-ray tubes use conical or flat targets. Conical targets generally provide a large radial sector sweeping a wide angle of the transmitted X-rays, due to the target's relatively large focal point which, in turn, is realized as an annular surface around the cone of the target. As a consequence, contrast is relatively poor. For example, in the structural examination of vehicle tires, such as steel cord tires, it is possibly that the wires cannot be distinguished.

In case of flat targets, the first four to six degrees which adjoin the plane of the target surface are not suited for the generation of applicable X-rays. Therefore, a conical radiation shape is achieved which due to the necessary oblique arrangement of the surface relative to the tube axis, leads to a non-uniform image of the concurrently penetrated tire portions and thus to a distortion.

Although such a target provides a reasonable contrast due to the small surface of the focal point, it cannot be distinguished whether a wire in the tire has an intentional curvature or whether a distortion is observed.

It is the object of the present invention to provide an omni-directional X-ray tube which provides high contrast capability while producing a nearly distortionless image also of geometrically non-uniform objects.

This object is attained by the features of the characterizing portion of claim 1.

In the omni-directional tube according to the invention at least two focal points are generated on a target. In order to accomplish this, one electron source and an electron optics combination is associated with the cathode for each focal point. It is further essential to the invention that the location of the focal point on the target is selected such that the radiation generated from the focal point extends into only a portion of the sector corresponding to the arc angle of the window in the plane thereof. If, for example, the window of the X-ray tube allows a beam sector of 270°, a focal point for example generates a beam sector of 90° or 180°. The remaining sector portion is associated with the other focal point. In order to avoid grey shadows and the unsatisfactory images resulting therefrom, the beams originating from the individual focal points are shielded against each other.

With the omni-directional X-ray tube according to the present invention, the advantages of a flat anode and a conical anode are combined without having the disadvantages thereof. The X-ray tube according to the invention, thus, enables a satisfactory omni-directional beam covering a large arc angle and having a remarkable discrimination capacity.

Prior art X-ray tubes are known which possess two targets or two focal points, respectively, i.e. a small and a large focal point. However, with such X-ray tubes the targets are not operated contemporaneously, but rather, are operated subsequentially.

Different geometrical shapes can be used for a target in order to achieve the desired beam shape. In an alternate embodiment of the invention, the portion of the target facing the cathode is formed like in a saddle shape, where the focal points are established on each saddle-shaped surface. Correspondingly, the cathode needs two electron source-electron beam optics combinations in order to focus the electron beam on the target on each focal point. Theoretically, such an anode enables an omni-directional beam of about 360°, which, normally is not needed. In the border area between adjacent subsectors a dead zone is formed of about 4° which cannot be used to produce an image. This zone is in the area of the plane which extends through the ridge of the roof-like anode. The dead zone can be arbitrarily positioned in accordance with the object to be tested if the arrangement of the cathode and the anode is selected correspondingly.

In a second alternative embodiment of the invention, the portion of the target facing the cathode has the shape of a quadrihedral pyramid, a focal point on each of the three lateral surfaces being formed. By this, three beam sectors separated from each other can be achieved, for example having an angle of 90° if the total beam angle amounts to 270°. Finally, the target can be conically shaped, two or more focal points being formed on the circumference thereof.

Screening is achieved due to the angular location of the targets on the surfaces of the anode. The apex of the anode acts to create the dead zone. If required, an additional screening can be used, e.g. for example, a flat screen of lead or other suitable material.

The omni-directional X-ray tube according to the present invention is particularly suited for the universal X-ray examination of a vehicle tire rotatably supported where the omni-directional X-ray tube is located in the space surrounded by the tire adjacent to the opened inner side thereof while the radiation is penetrating the lateral walls and the tread of the tire from inside outside. Further, the receiving means can be defined by three linear diode arrangements (diode lines) which are arranged approximately parallel to the diameter or to the axis, respectively. According to an embodiment of the invention, the above mentioned dead zones can be located so as to correspond to linear diode arrangements where no image can be produced.

BRIEF DESCRIPTION OF THE DRAWINGS

The invention will be explained according to the drawings.

Before going into detail with respect to the drawings it should be noted that each of the described features alone or in connection with features of the claims is essential to the invention.

DETAILED DESCRIPTION OF THE PREFERRED EMBODIMENT

Figure 1:
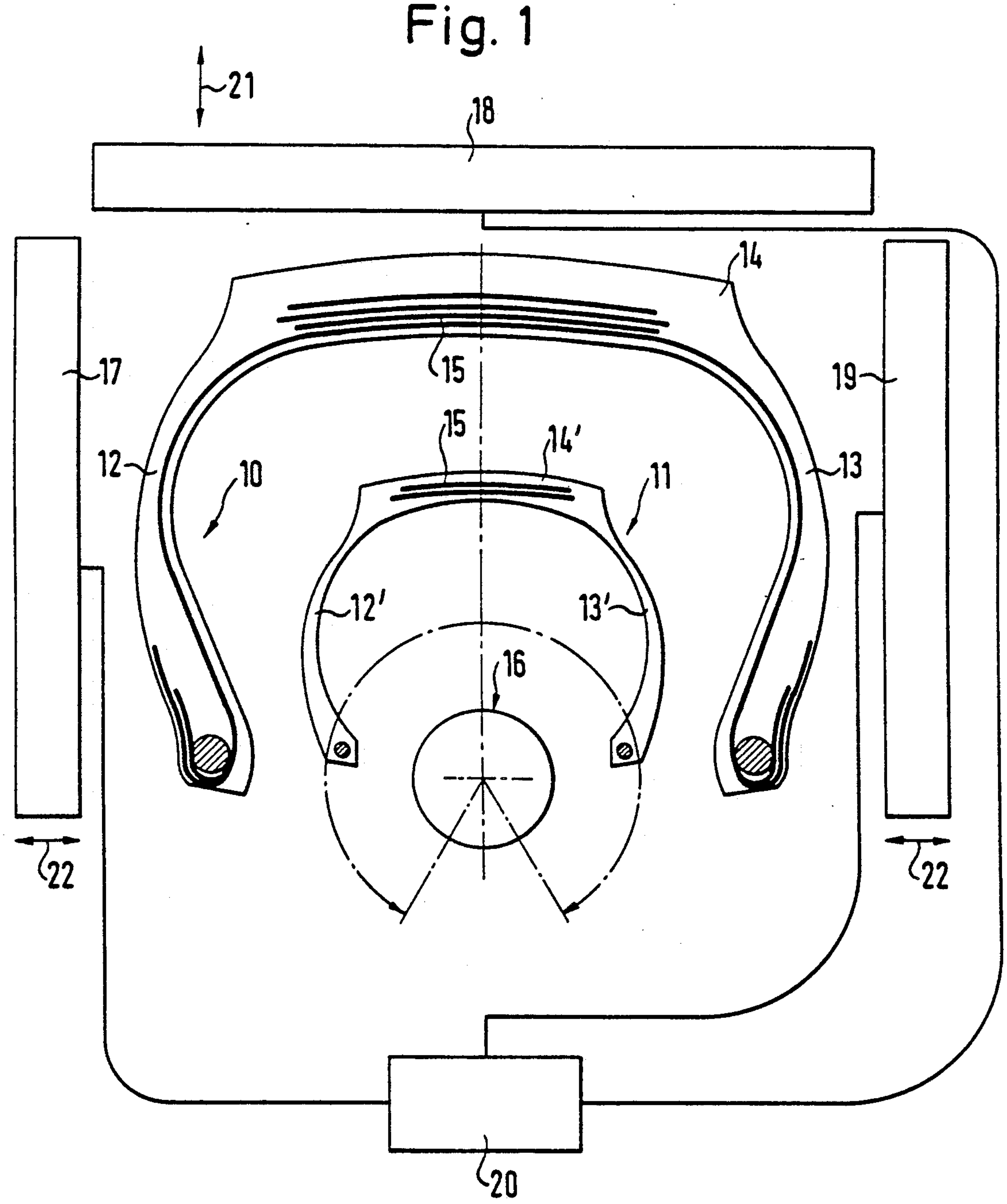
FIG. 1 is a perpendicular axial cross section through a tire and an a diagrammatic side view of the device for the examination of vehicle tires by means of an omni-directional tube according to the invention.

In FIG. 1 a cross section through two tires 10, 11 of different sizes is shown. The side walls 12, 13 or 12', 13', respectively, and the tread 14, 14' are provided with plastic cord 15 or steel cord, respectively, or the like. The tire 10 or, 11 is supported for rotation about its axis in a manner known within the industry. The necessary corresponding structural means are not shown; they belong to the prior art. Also protectional means for X-ray test means are not shown.

An omni-directional X-ray tube 16 is located at the entrance of the tire 10 or 11. In a radial plane with respect to the tire (here the drawing plane) the omni-directional tube 16 has a beam angle of about 300°. Thus, in the radial plane all portions of the tires are penetrated by the radiation of tube 16 about an angle of 180°. It is understood that the X-ray tube 16 can be placed more radially inwardly or more radially outwardly of the tire. In a plane perpendicular to the radial plane, the omni-directional X-ray tube 16 has a beam angle of about 40°.

On the radially outward sides of the outer walls 12, 13 or 12', 13', respectively, and on the radially outward side of the tread 14, 14', diode detectors 17, 18 and 19 are provided. In FIG. 1 these are shown only diagrammatically. Each diode detector 17 to 19 includes a linear arrangement of individual light-sensitive diodes, the series of diodes of the detectors 17 and 19 extend approximately parallel to the tire diameter while the series of diodes of arrangement 18 extends parallel to the tire axis. The diodes are cyclically scanned, and the scanned signals are stored in a manner known in the industry so that a series of scans can contemporaneously appear on a display means, e.g. an image screen. The display means 20 is diagrammatically indicated. Display 20 may consist of three individual screens, or of one single screen on which all portions of the tire 10 or 11, respectively, can be viewed.

The diode detectors 17 to 19 are arranged in a U-shaped configuration and are jointly supported on a support member not shown. The support member can be displaced in the direction of double arrow 21 in a machine frame (not shown). The diode arrangements 17 and 19 in turn can be displaced on the support member parallel to itself as indicated by the double arrows 22. Using this adjustment, equal spacing between the tires 10 or 11, the tread 14 and the detectors 17 to 19 can be achieved and so that a uniform image scale is produced. The displacement means, which belong to the prior art, are also not shown.

Figure 2:
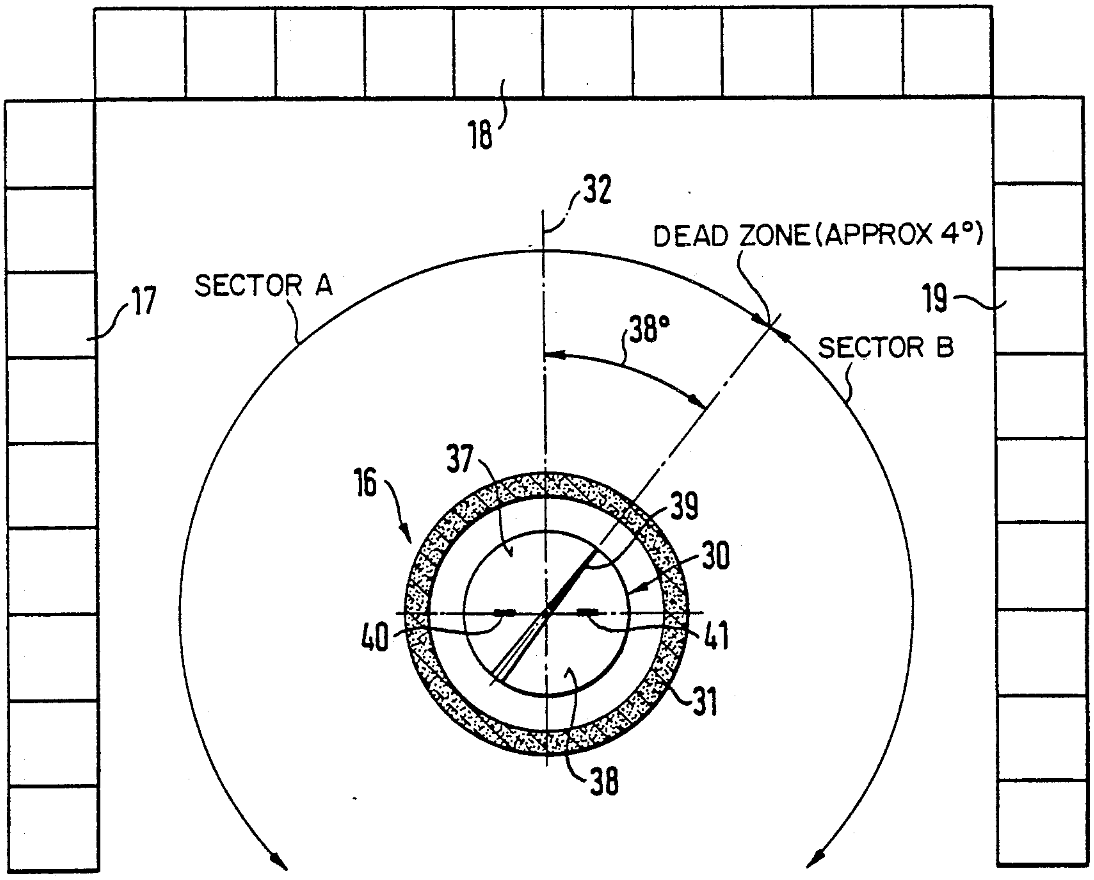
FIG. 2 is a diagrammatic cross-sectional view on the omni-directional tube according to the invention, e.g. that of FIG. 1.
Figure 3:
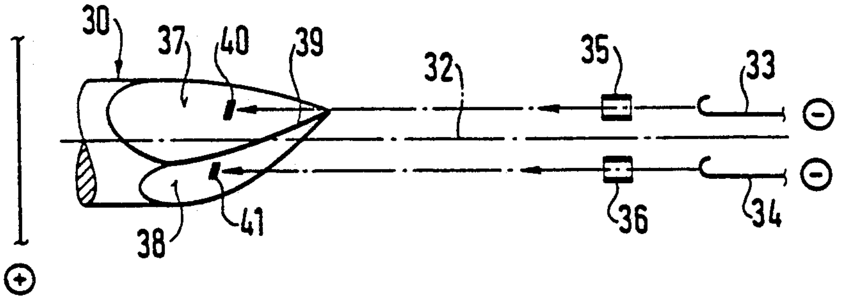
FIG. 3 is an enlarged view of the structure of the omni-directional tube of FIG. 2.

In FIG. 2 the target 30 and the beryllium window 31 which surrounds the target of the omni-directional tube 16 of FIG. 1 are shown. The tube axis is designated by 32 and the both filaments and the electron optics associated therewith are not shown. These are diagrammatically shown in FIG. 3. The filaments there are designated by 33 and 34 and the electron optics by 35 or 36, respectively. As can be seen, the target 30 includes two angularly extending faces 37, 38 which intersect in apex 39. The faces 37, 38 are tilted with respect to the tube axis 32 such that focal points 40, 41 are formed. Each face 37, 38 with the associated focal point 40, 41 corresponds to an associated sector A or B, respectively. The ridge 39 is positioned such that the dead zone in the plane of the ridge 39 extends through the area where the diode lines 18, 19 meet. In this area no image can be formed of the penetrated surfaces. It is understood that an additional screening in the plane of the ridge can be provided in order to prevent an overlapping of the beams originating from the focal points 40, 41.

Related to the testing of tires according to FIG. 1, the radiation transmitted by the focal point 40 is used for inspection of the left tire wall in FIG. 1 and its tread, while the radiation from the focal point 41 is used to inspect the right tire wall. Placement of the omni-directional tube 16 in close proximity to the tire results in a very small spot size at the focal point, with the effect that, the contrast is remarkably improved beyond that achieved using prior art inspection techniques.

Figure 4:
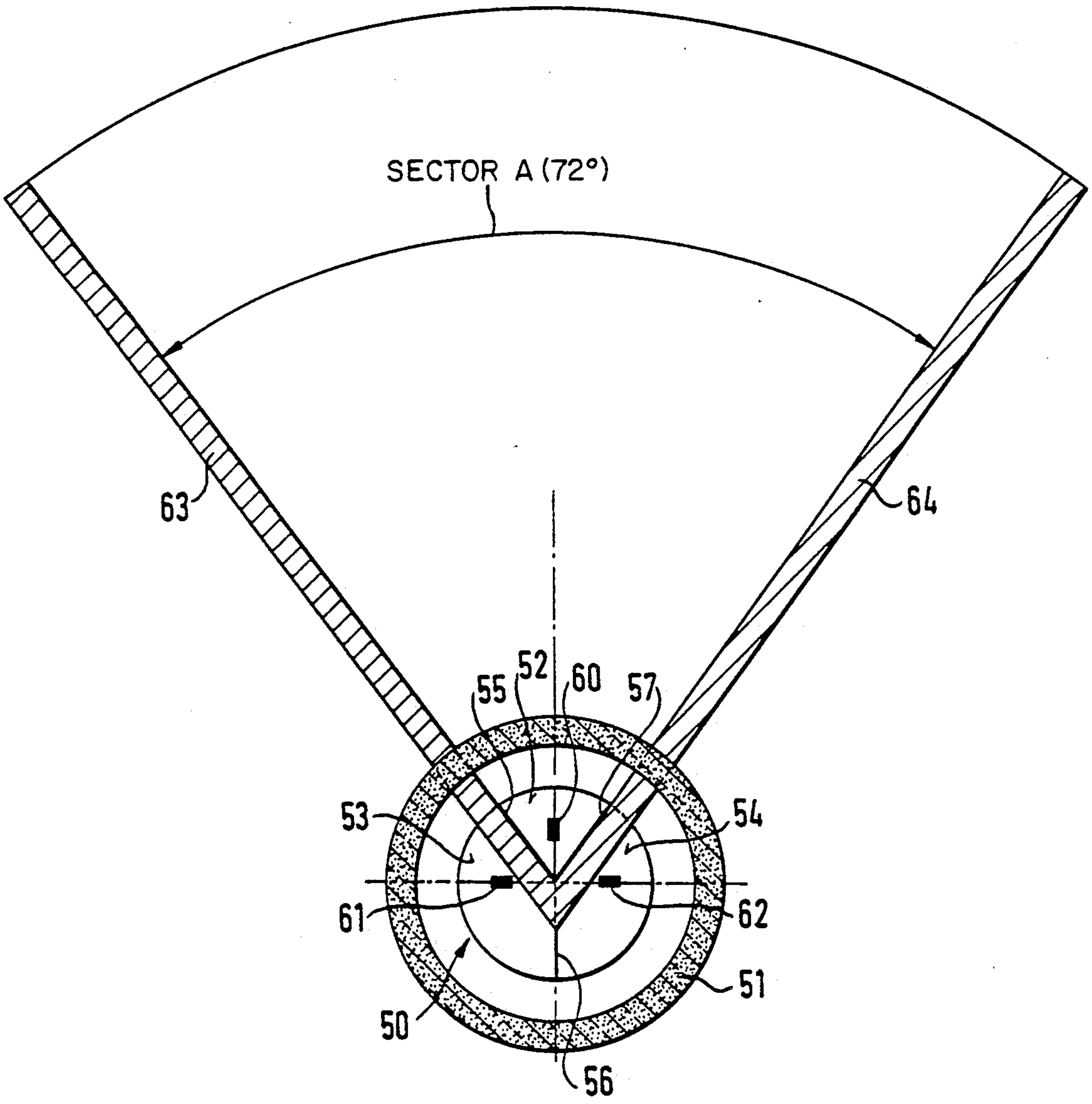
FIG. 4 is a cross-sectional view of another form of omni-directional tube according to the invention.

In the embodiment according to FIG. 4 a quadrihedral pyramid is formed in the portion of the target 50 facing the cathode, where the target is surrounded by a beryllium window 51. Three of the lateral surfaces of the pyramid are designated by 52, 53 and 54. The edges therebetween are designated by 55, 56 and 57. By means of three X-ray source/electron optics combinations, not shown, three focal points 60, 61, 62 are generated on surfaces 52 to 54. Lead plates 63, 64 are associated with edges 55 and 57 extending along a plane through the edges 55, 57. Plates 63 and 64 serve as additional screening of the X-rays transmitted by the focal point 60 to 61 in order to avoid an overlapping or superimposing of the adjacent sectors. The sector A covered by the focal point 60 has for example an angle of 72°, thus, may serve for the penetration of the tread according to the embodiment of FIG. 1. The radiation transmitted by the focal points 61, 62 is used for the examination of the tire side walls. The remaining components and materials for making an omni-directional tube according to the invention, e.g. the cathode, the target etc. are known in the prior art and are not described.

I claim:

1. An omni-directional X-ray tube for projecting radiation over a wide angle comprising:

a plurality of means for generating directive electron beams;

a target having a plurality of faces, said plurality of faces intersecting each other at an angle less than 180° creating an apex at a line of intersection of two faces, one face corresponding to and facing each generating means such that a focal point is generated on said face;

an annular-section-like X-ray transmissive window partially surrounding said target, X-rays being emitted from each said focal point and through said window to form a radiation pattern comprising a sweeping sector; and a screen of X-ray impervious material disposed at each intersection line of two adjacent radiation patterns whereby a dead zone is formed between adjacent radiation patterns corresponding to each said apex so that interference of one radiation pattern by another is avoided.

2. An X-ray tube as in claim 1 wherein said target has two faces and is formed in the shape of a saddle so that said apex is curved and two said focal points are formed, one on each face.

3. An X-ray tube as in claim 1 wherein said target has four faces and is formed in the shape of a quadrihedral pyramid with a focal point formed on each of three said faces.

4. An X-ray tube as in claim 1 wherein said screen comprises lead.

5. An omni-directional X-ray tube for projecting radiation over a wide angle comprising:

a plurality of means for generating directive electron beams;

a target having a configuration of a cone, said cone having a circumference at a plane bisecting said cone with a plurality of focal points formed on said circumference, one focal point corresponding to each generating means;

an annular-section-like X-ray-transmissive window partially surrounding said target, X-rays being emitted from each said focal point and through said window in a radiation pattern comprising a sweeping sector; and a screen of X-ray impervious material disposed at each intersection line of two adjacent radiation patterns whereby a dead zone is formed between adjacent radiation patterns so that interference of one radiation pattern by another is avoided.

6. An X-ray tube as in claim 5 wherein said screen comprises lead.

7. An X-ray inspection apparatus for examining a tire having two sidewalls, a tread and an open inner side comprising:

a means for supporting said tire for rotation around an axis at the diametric center of said tire;

an X-ray tube disposed in an area surrounded by said tire adjacent to said open inner side, said X-ray tube comprising:

a plurality of means for generating directive electron beams;

a target having at least one face, a combination of all faces having a generally conical shape with a plurality of focal points generated on said face or faces, one focal point corresponding to each generating means;

an annular-section-like X-ray transmissive window partially surrounding said target, X-rays being emitted from each said focal point and through said window to form a radiation pattern comprising a sweeping sector;

a screen of X-ray impervious material disposed at each intersection line of two adjacent radiation patterns whereby a dead zone is formed between adjacent radiation patterns; and a plurality of linear diode arrays disposed to surround a portion of said tire being examined, one array corresponding to each focal point to receive radiation which penetrates said tire to provide an image for detection of defects in said tire.

8. An X-ray inspection apparatus as in claim 7 wherein said plurality of arrays is positioned so that an intersection point of two linear diode arrays corresponds to said dead zone.

9. An X-ray inspection apparatus as in claim 7 wherein said target has two faces with one focal point generated on each face.

10. An X-ray inspection apparatus as in claim 7 wherein said target has four faces with one focal point generated on each of three faces.

11. An X-ray inspection apparatus as in claim 7 wherein said target has one face and is in the shape of a cone with at least two focal points generated on said face.

* * * * *